E. W. GREEN & J. THOMSON.
DEVICES FOR CUTTING SCREW-THREADS.
No. 180,869. Patented Aug. 8, 1876.
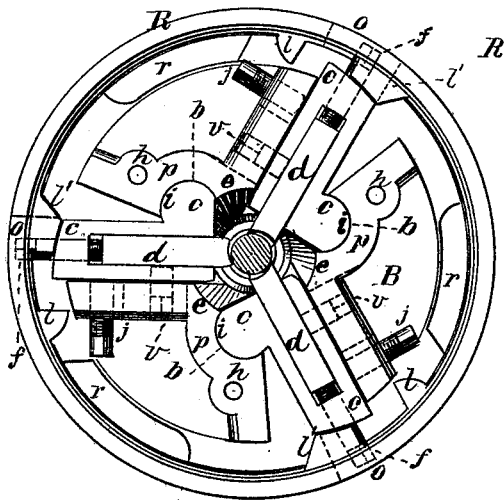
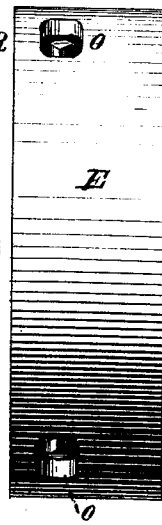
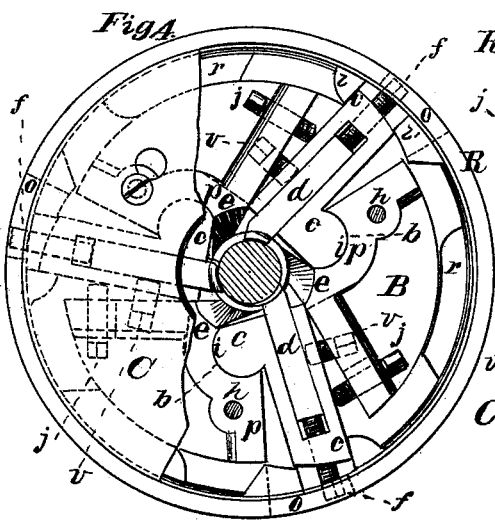
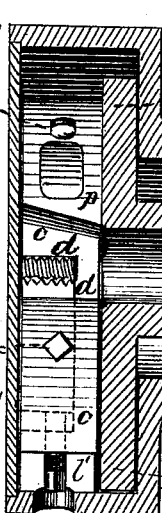
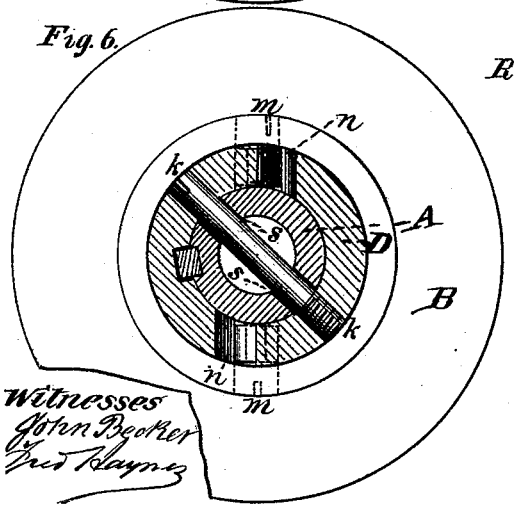
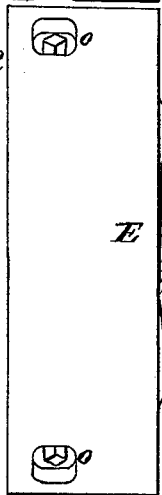
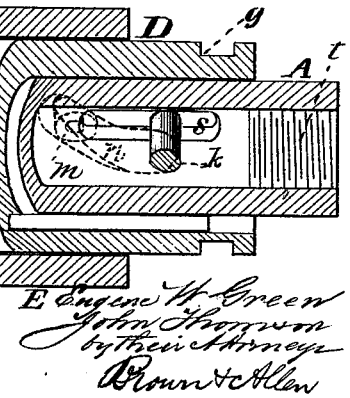

UNITED STATES PATENT OFFICE.

EUGENE W. GREEN AND JOHN THOMSON, OF PORTSMOUTH, OHIO.

IMPROVEMENT IN DEVICES FOR CUTTING SCREW-THREADS.

Specification forming part of Letters Patent No. 180,869, dated August 8, 1876; application filed July 6, 1876.

*To all whom it may concern:*

Be it known that we, EUGENE W. GREEN and JOHN THOMSON, both of Portsmouth, in the county of Scioto and State of Ohio, have invented an Improved Screw-Cutting Head; and we do hereby declare that the following is a full, clear, and exact description of the same, reference being had to the accompanying drawing, which forms part of this specification.

Our invention relates to screw-cutting heads which contain dies for cutting screws, and are attached to lathes and screw-cutting machines; and it consists in mechanism by which the screw-cutting dies forming part of the screw-cutting head are simultaneously applied to or withdrawn from the pipe, rod, or bolt upon which a screw-thread is desired to be cut, and whereby the length of the threaded part of such pipe, rod, or bolt is accurately gaged or measured, and whereby, when the thread is completed, the dies are automatically withdrawn from the work.

Figure 1 in the accompanying drawing is an external side view of a screw-cutting head comprising our improved construction. Fig. 2 is a front-end view of the same, with the plate which covers the interior mechanism removed. Fig. 3 is an irregular longitudinal section. Fig. 4 is a front-end view of the screw-cutting head, with a portion of the covering-plate removed to show the position of the dies while the said dies are being cut by a master-tap. Fig. 5 is a side view of the screw-cutting head, with a portion broken away to show the details of construction. Fig. 6 is a cross-section made on the line $x\ x$, Fig. 3.

A, Figs. 1, 3, 5, and 6, is the spindle of the screw-cutting head, internally threaded at $t$, Figs. 3 and 5, to screw on the mandrel of a lathe or screw-cutting machine. The spindle A supports all other parts of the screw-cutting head. Through the spindle is cut a longitudinal slot, $s$, Figs. 3, 5, and 6. At the end of the spindle A, opposite the internal thread $t$, is a plate or disk, B, which is rigidly attached to the said spindle. At uniform intervals around the edge of the disk B recesses $r$, Figs. 2 and 4, are cut therein, the use of which is hereinafter explained. Upon the front surface of the disk B are formed projections $p$, Figs. 2, 3, and 4. In these projections $p$ are formed screw-holes $h$, Figs. 2 and 4, for the attachment of the front plate C, Figs. 3 and 4, and semicircular bearings $b$ are also formed, Figs. 2 and 4, for the die-carriers $c$, Figs. 2, 3, and 4. Upon the spindle A is fitted a sleeve, D, Figs. 1, 3, 5, and 6. A pin, $k$, Figs. 3 and 5, passes through the said sleeve D, through the slot $s$ in the spindle A, and screws into the side of the sleeve, as shown in Fig. 3. This pin allows the sleeve D to slide longitudinally upon the spindle A, but prevents the said sleeve from turning upon said spindle. In use, both said sleeve and spindle turn together. In the exterior of said sleeve D, near the end which lies nearest the end of the spindle A, which screws onto the lathe-mandrel, is cut a groove, $g$, into which, when the screw-cutting head is used, are fitted suitable devices (not shown in the drawing) for moving said sleeve longitudinally on the spindle A, a bifurcated lever and a collar being conveniently used for this purpose. In opposite sides of the sleeve D are cut curved slots $n$, Figs. 5 and 6, so placed as to co-operate, for a purpose hereinafter specified.

The outer box E of the screw-cutting head is fitted upon the sleeve D, as shown in Figs. 1, 3, 5, and 6. It has an internal shoulder, which abuts against the rear side of the disk B, and a rim, R, of sufficient width to inclose the projections $p$ and die-carriers $c$ on the said disk. The edge of the rim $r$ is recessed to receive the plate C, as shown in Figs. 3 and 4. On the inner side of the rim R of the box B are formed stops $l\ l'$, Figs. 2 and 3. When the disk B is placed in the box E in such manner that the recesses $r$ in the edge of said disk may allow the disk to pass the stops $l\ l'$, it may be passed into the box until it abuts against the internal shoulder of said box, as shown in Fig. 3; and if it be then turned so that the portions of the edge of the said disk B not recessed are brought under said stops $l\ l'$, the said disk will be held in proper relation with the said box, as shown in Figs. 3 and 4.

Screws $m$, Figs. 1, 3, 5, and 6, pass through said box and project into the curved slot $n$, Figs. 5 and 6. The said curved slots are so formed that their sides act against the sides of the screws $m$, and co-operate to turn the said box relatively to the spindle A and sleeve B, whenever the said sleeve is moved longitudinally on the said spindle. This motion of the box acts upon the die-carriers $c$ through the stops *l l'*, as hereinafter more fully set forth.

The projections *p*, Figs. 2, 3, and 4, which project from the disk B, are angular in form, the two parts of each that form the sides of the angle having a relative inclination to each other of about one hundred and twenty (120) degrees. The projections are, preferably, three in number, and the angles of all the projections are truncated, by turning a taper off of each, this being conveniently done in a lathe, and the angles of said projections being truncated simultaneously. This taper is shown in Figs. 2 and 4, at *e*. A straight semi-cylindrical bearing, *b*, is also cut in each projection *p*, which, owing to the taper *e*, is slightly more than semi-cylindrical at the part where the said each projection unites with the disk B, and somewhat less than semi-cylindrical at the part where the said projections meet the plate C, Figs. 3 and 4. The semi-cylindrical bearings *b* receive the bearings *i*, Figs. 2 and 4, of the die-carriers *c*.

The die-carriers *c* are slotted to receive the dies *d*, Figs. 2, 3, and 4. The said dies fit snugly in the slotted die-holders *c*, and are set toward the center of the screw-cutting head by means of set-screws *f*, which are reached by a suitable key or wrench through slots *o*, Figs. 1, 2, 4, and 5, in the box E.

The cutters of the dies are presented to the work at the proper angle by means of set-screws *j*, Figs. 2, 3, 4, inserted in the projections *p*, against which set-screws the die-carriers *c* abut when in use, and which limit in one direction the turning of said die-carriers on their bearings *i*, so that they work with the least possible friction; and the said dies are held firmly in the slotted die-carriers by other set-screws *u*, Figs. 2, 3, and 4, inserted through the sides of said die-carriers, and reached through slots *u* in the projections *p* on the disk B when the plate C is removed.

The operation of the invention, so far as at present described, is as follows: When the spindle A is screwed on the mandrel, and is at rest, and the sleeve D is slid along toward *t*, Fig. 3, the pin *k* slides along with said sleeve, said pin moving longitudinally in the slot *s* in the spindle A, but preventing the rotation of said sleeve upon said spindle. The curved slots *n*, Figs. 5 and 6, then act on the screws *m*, which pass through the box E into said slots *n*, and cause the said box E to rotate partially in a direction like that of the hands of a watch. The lugs *l* on the inner side of the rim R of the box E then act against the sides of the outer ends of the die-carriers *c*, and move them along in the same direction, thus turning the said die-carriers on their bearings *i*, and separating the dies for the insertion of the bar, bolt, or pipe on which a thread is to be cut.

When the sleeve D is slid along the spindle in an opposite direction to that just described, the box E is partially rotated in a direction opposite to that of the hands of a watch. The lugs *l'* then act against the outer ends of the die-carriers *c*, and rotate them partially on their bearings *i* in the same direction, thus forcing them down to their proper position for cutting the desired thread.

The inner sides of the lugs *l'* and the outer ends of the die-carriers *c* are inclined similarly and relatively to the rim R of the box B, and during the turning of the said die-carriers the inclined surfaces of said lugs *l'* are brought to bear firmly upon the said outer and inclined ends of said die-carriers, so as to hold the die-carriers and dies from retreating from the work while cutting the desired thread. This position of the parts is shown in Fig. 2.

In cutting the dies by a master-tap the said dies are adjusted, as shown in Fig. 4, by the use of the set-screws *j*; but in use they are, by the same set-screws, adjusted so that in cutting a thread, as above described, the requisite clearance to avoid undue friction is secured, as shown in Fig. 2.

The release of the dies from the work when the thread is cut, and the cutting of threads of uniform length, are automatically effected by the following means: The spindle A is made hollow throughout its entire length, and in it is fitted a gage-bar, G, Fig. 3, which abuts against the pin *k*. The gage-bar G must, therefore, move with the sleeve D. As the pipe, bolt, or bar desired to be threaded feeds into the screw-cutting head, it eventually abuts against the end of the gage-bar, and pushes it, together with the sleeve D, toward the mandrel upon which the screw-cutting head is screwed. This, through the medium of the curved slots in the said sleeve D and the screws *m*, causes the box to partially rotate relatively to the spindle A, in the direction of the hands of a watch, and the lugs *l*, on the inner side of the rim R, to act against the die-carriers to release the dies from the work, as hereinbefore described.

The gage-bar G is removable, and by using different lengths of gage-bars threads of any required length within the capacity of the screw-cutting head may be uniformly cut.

We claim—

1. The combination of the cam-slotted sleeve D, the spindle A, the die-carrying disk B, the box E, having the lugs *l l'*, for actuating the die-carriers *c*, the pin *k*, and the screws *m*, substantially as and for the purpose described.

2. The combination of the sliding gage-bar G with the cam-slotted sleeve D, the slotted spindle A, the die-carrying disk B, the box E, having the lugs *l l'*, for moving the die-carriers *c* to and away from the work, the pin *k*, and the screws *m*, substantially as and for the purpose described.

EUGENE W. GREEN.
JOHN THOMSON.

Witnesses:
 A. CORIELL,
 P. J. HONAKER.